United States Patent
Halsey

(10) Patent No.: US 11,269,392 B2
(45) Date of Patent: Mar. 8, 2022

(54) SYSTEM AND METHOD FOR MAINTAINING POWER SOURCE

(71) Applicant: GE Aviation Systems Limited, Cheltenham (GB)

(72) Inventor: Colin John Halsey, Tewkesbury (GB)

(73) Assignee: GE Aviation Systems Limited, Gloucestershire (GB)

( * ) Notice: Subject to any disclaimer, the term of this patent is extended or adjusted under 35 U.S.C. 154(b) by 63 days.

(21) Appl. No.: 16/589,732

(22) Filed: Oct. 1, 2019

(65) Prior Publication Data
US 2020/0103950 A1 Apr. 2, 2020

(30) Foreign Application Priority Data
Oct. 1, 2018 (GB) ..................................... 1816027

(51) Int. Cl.
| | | |
|---|---|---|
| G06F 1/30 | (2006.01) | |
| G06F 11/14 | (2006.01) | |
| G06F 11/20 | (2006.01) | |
| H01M 10/44 | (2006.01) | |
| H02J 9/06 | (2006.01) | |
| G06F 12/0802 | (2016.01) | |
| G06F 12/08 | (2016.01) | |

(52) U.S. Cl.
CPC ............ *G06F 1/30* (2013.01); *G06F 11/1441* (2013.01); *G06F 11/2015* (2013.01); *G06F 12/0802* (2013.01); *H01M 10/441* (2013.01); *H02J 9/061* (2013.01)

(58) Field of Classification Search
CPC .... G06F 1/30; G06F 11/1441; G06F 11/2015; G06F 12/0802; H01M 10/441; G02J 9/061

USPC ......................................................... 711/162
See application file for complete search history.

(56) References Cited

U.S. PATENT DOCUMENTS

| | | | | |
|---|---|---|---|---|
| 6,049,193 A * | 4/2000 | Chien | ................. | H02J 7/00712 320/132 |
| 6,599,655 B2 * | 7/2003 | Johnson | ................ | H02J 7/0016 429/50 |
| 7,489,106 B1 | 2/2009 | Tikhonov | | |
| 7,510,376 B2 | 3/2009 | Lee et al. | | |
| 7,598,706 B2 | 10/2009 | Koski et al. | | |
| 7,928,691 B2 * | 4/2011 | Studyvin | ............... | H02J 7/0018 320/116 |

(Continued)

FOREIGN PATENT DOCUMENTS

| | | |
|---|---|---|
| FR | 2976743 A1 | 12/2012 |
| WO | 2012172035 A1 | 12/2012 |

OTHER PUBLICATIONS

European Patent Office, European Search Report re Application No. 19200652.6-1202, dated Feb. 5, 2020, 9 pages, Munich, Germany.

*Primary Examiner* — Christopher B Shin
(74) *Attorney, Agent, or Firm* — McGarry Bair PC

(57) ABSTRACT

A method for maintaining a power source can include selecting, by a controller module, a rechargeable power storage device from a set of power storage devices arranged to selectively provide a summated output of the power source, and selectively enabling the selected power storage device to discharge its stored power at the output of the power source. The controller module can compare a sensed voltage of the selected power storage device with a minimum voltage threshold.

20 Claims, 8 Drawing Sheets

(56) References Cited

U.S. PATENT DOCUMENTS

| | | | |
|---|---|---|---|
| 8,427,105 B2 | 4/2013 | Plett | |
| 9,136,715 B2* | 9/2015 | Wu | H02J 7/0026 |
| 9,153,845 B2* | 10/2015 | Tanaka | B60L 50/64 |
| 9,222,985 B2 | 12/2015 | Kang et al. | |
| 9,755,281 B2 | 9/2017 | Poehler et al. | |
| 9,979,195 B2 | 5/2018 | Djan-Sampson et al. | |
| 2005/0040789 A1 | 2/2005 | Salasoo et al. | |
| 2008/0030169 A1* | 2/2008 | Kamishima | G01R 31/3828 |
| | | | 320/134 |
| 2012/0139546 A1* | 6/2012 | Wortham | H02J 7/0078 |
| | | | 324/427 |
| 2013/0038292 A1* | 2/2013 | Barrett | G01R 31/367 |
| | | | 320/134 |
| 2016/0352102 A1 | 12/2016 | Zhao et al. | |
| 2017/0141598 A1 | 5/2017 | Desbois-Renaudin | |
| 2018/0099579 A1 | 4/2018 | Hale | |
| 2018/0131197 A1 | 5/2018 | McEwan | |
| 2018/0241227 A1 | 8/2018 | Halsey | |
| 2019/0165584 A1* | 5/2019 | Laflaquiere | B60L 58/13 |

* cited by examiner

SYSTEM AND METHOD FOR MAINTAINING POWER SOURCE

CROSS REFERENCE TO RELATED APPLICATION(S)

This application claims priority to and benefit of United Kingdom Patent Application No. 1816027.5 filed Oct. 1, 2018, which is incorporated herein in its entirety.

TECHNICAL FIELD

The disclosure relates to a method and system for operating a rechargeable power storage device and resetting charge data for the rechargeable power storage device.

BACKGROUND

Electrical power distribution systems manage the allocation of power from energy sources to electrical loads that consume the distributed electrical power. For example, in an aircraft, one or more turbine engines provide for propulsion of the aircraft and can further provide mechanical energy that ultimately powers a number of different accessories such as generators, starter/generators, permanent magnet alternators (PMAs), fuel pumps, and hydraulic pumps, e.g., equipment for functions needed on an aircraft other than propulsion. Contemporary aircraft can utilize electrical power for electrical loads related to avionics, motors, and other electric equipment.

Energy storage packs, cells, or the like can provide electrical power for electrical loads, and can include one or more power sources or cell stacks configured in parallel and series combinations to achieve a desired operating voltage and a current capacity generally measured in amp-hours. Also, an increase in loading on the energy storage pack comprising healthy cells can drop the stack operating voltage below the minimum stack voltage due to the internal resistance of each battery cell.

BRIEF DESCRIPTION

In one aspect, the disclosure relates to a method for maintaining a power source. The method includes selecting, by a controller module, a rechargeable power storage device from a set of power storage devices arranged to selectively provide a summated output of the power source, selectively enabling, by the controller module, the selected power storage device to discharge its stored power at the output of the power source, and comparing, by the controller module, a sensed voltage of the selected power storage device with a minimum voltage threshold. The method further includes, upon satisfaction of the comparison, selectively disabling the selected power storage device from discharging its stored power, applying a recharging power to the selected power storage device until the selected power storage device is fully recharged based on the sensed voltage, and resetting at least one of state of charge data or capacity data of the selected power storage device.

In another aspect, the disclosure relates to a system for maintaining a power source. The system includes a set of power storage devices arranged to selectively provide a summated output of the power source, each of the set of power storage devices having a voltage sensor and memory storing at least one of state of charge data or capacity data, a recharging power source, and a controller module configured to select a rechargeable power storage device from the set of power storage devices, to selectively enable the selected power storage device to discharge its stored power to the output of the power source, to compare a voltage sensed by the voltage sensor of the selected power storage device with a minimum voltage threshold, and upon satisfaction of the comparison, to selectively disable the selected power storage device from discharging its stored power, to apply a recharging power from the recharging power source to the selected power storage device until the selected power storage device is fully recharged based on the sensed voltage, and to reset at least one of the state of charge data or the capacity data of the selected power storage device.

In yet another aspect, the disclosure relates to a method for maintaining a power source. The method includes selecting, by a controller module, a rechargeable power storage device from a set of power storage devices arranged in series and each having a voltage connection and a bypass connection, selectively enabling, by the controller module, the voltage connection of the selected power storage device such that the power storage device discharges its stored power at an output of the power source, and comparing, by the controller module, a sensed voltage of the selected power storage device with a minimum voltage threshold. The method further includes, upon satisfaction of the comparison, selectively disabling the voltage connection of the selected power storage device, selectively enabling the bypass connection of the selected power storage device, applying a recharging power to the selected power storage device until the selected power storage device is fully recharged based on a sensed voltage, and resetting at least one of state of charge data or capacity data of the selected power storage device.

DETAILED DESCRIPTION

Figure 1:
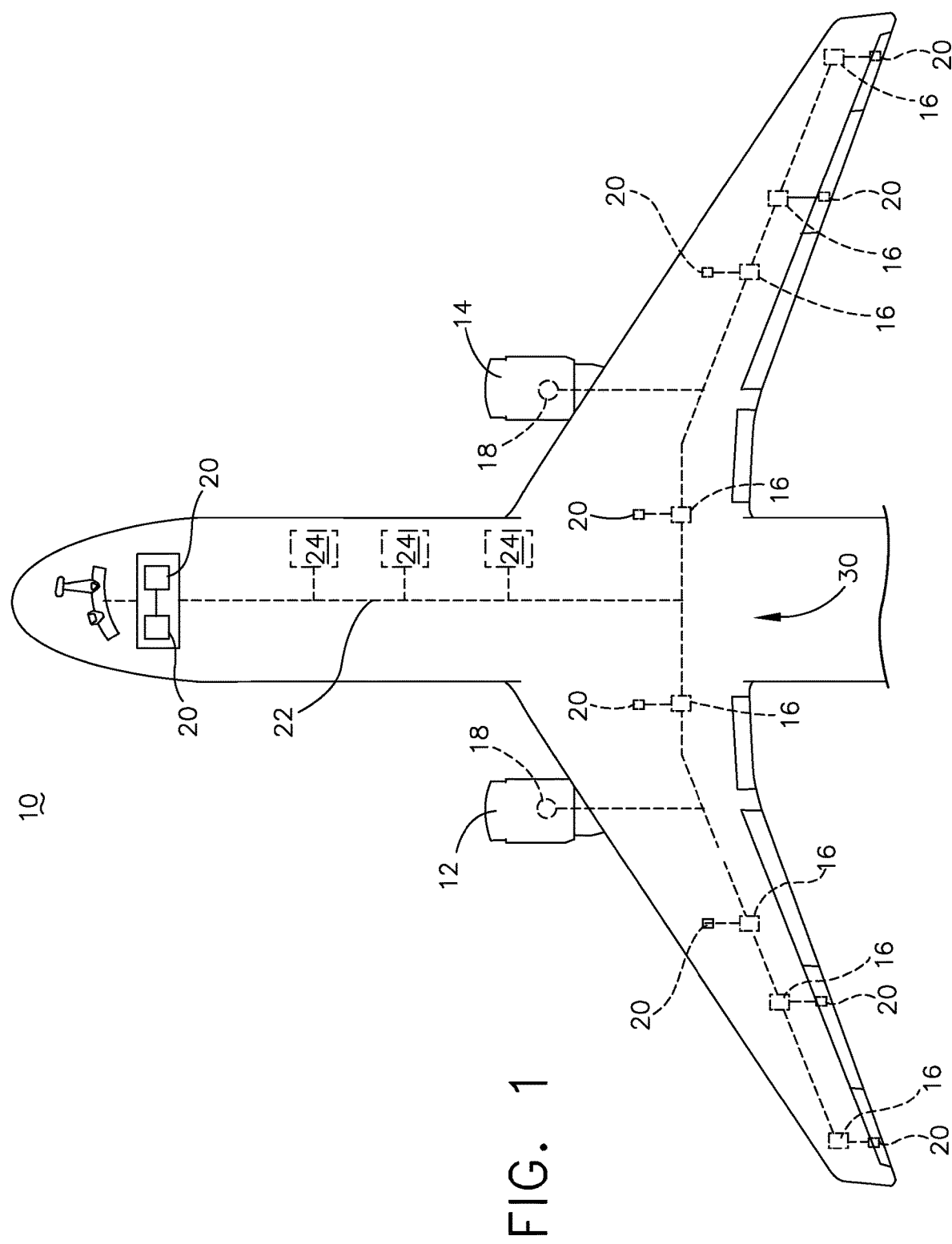
FIG. 1 is a top-down schematic view of an aircraft and power distribution system in accordance with various aspects described herein.

Aspects of the present disclosure are described herein in the context of a power source in an aircraft, which enables production of electrical power from an energy source such as a turbine engine, jet fuel, hydrogen, etc. However, it will be understood that the disclosure is not so limited and has general applicability to power distribution systems in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

Power sources such as direct-current (DC) power sources typically include at least one battery cell configured to provide a voltage output. It is possible to measure, monitor, calculate, or store data related to such power sources, including state of charge data or capacity data. State of charge data can refer to an amount or relative amount of available charge or voltage remaining in a battery cell, such as "100% remaining." State of charge data can be calculated or estimated in a variety of conventional ways, including chemical methods, Coulomb counting, or standard power discharge curves for various types of battery cells. In addition, capacity data can refer to a maximum amount of charge or maximum voltage output that a battery cell can provide. In addition, state of charge data can be relative to a battery's capacity data, e.g. 85% of 3.0 amp-hours in one example.

Aspects of the disclosure generally relate to a system and method for maintaining a power source. As used herein, "maintaining" a power source will refer to methods or operations that can be utilized to calibrate data related to the power source. Such calibrations can include modifying, adjusting, erasing, or resetting state of charge data or capacity data for a battery cell within a power source. For example, a battery cell that sits dormant for an extended period of time without providing power can have errors in its state of charge or capacity data that do not reflect a true state of charge or capacity for the battery cell. In such a case, the battery cell can be maintained by a calibration procedure to improve the accuracy of its related data.

While "a set of" various elements will be described, it will be understood that "a set" can include any number of the respective elements, including only one element. The use of the terms "proximal" or "proximally" refers to moving in a direction toward another component, or a component being relatively closer to the other as compared to another reference point. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. The term "satisfies" with respect to a threshold value is used herein to mean that a sensed value is equal to or greater than the threshold value, or being within a threshold value range (e.g. within tolerance). It will be understood that such a determination may easily be altered to be satisfied by a positive/negative comparison or a true/false comparison.

Additionally, while terms such as "voltage", "current", and "power" can be used herein, it will be evident to one skilled in the art that these terms can be interrelated when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting examples of power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" enabling transmission of current from a switch input to a switch output, and a second mode of operation, wherein the switch is "open" disabling or preventing current from being transmitted between the switch input and switch output. In non-limiting examples, connections or disconnections, such as connections enabled or disabled by the controllable switching element, can be selectively configured to provide, enable, disable, or the like, an electrical connection between respective elements.

The exemplary drawings are for purposes of illustration only and the dimensions, positions, order and relative sizes reflected in the drawings attached hereto can vary.

Referring now to FIG. 1, an aircraft 10 is shown having at least one turbine engine, shown as a left engine system 12 and a right engine system 14. Alternatively, the power system can have fewer or additional engine systems. The left and right engine systems 12, 14 can be substantially identical, and can further include at least one power source, such as a set of respective generators 18. The left and right engine systems 12, 14 can further include another respective power source, such as a second electric machine or set of generators (not shown). Non-limiting aspects of the disclosure can be included wherein, for example, the left engine system 12 includes a first generator 18 as a primary power source and a secondary generator as a secondary, back-up, or redundant power source. The aircraft is shown further having a set of power-consuming components, or electrical loads 20, such as for instance, an actuator load, flight critical loads, and non-flight critical loads.

The electrical loads 20 are electrically coupled with at least one of the generators 18 via a power distribution system 30 including, for instance, power transmission lines 22 or bus bars, and a set of power distribution nodes 16. The aircraft 10 can further include a set of supplemental power sources 24 selectably connectable with the transmission lines 22, and operable to provide at least a portion of primary power, supplemental power, redundant power, backup power, emergency power, or the like. Non-limiting examples of the supplemental power sources 24 can include, but are not limited to, dischargeable or rechargeable sources of electrical energy, such as fuel cells, batteries, capacitors, supercapacitors, energy source "banks" of a set of devices, or any other source of electrical power. As shown, the set of supplemental power sources 24 can provide power to the set of transmission lines 22, and thus, the set of power distribution nodes 16 or the set of electrical loads 20.

In the aircraft 10, the operating left and right engine systems 12, 14 provide mechanical energy which can be extracted, typically via a spool, to provide a driving force for the set of generators 18. The set of generators 18, in turn, generate power, such as AC or DC power, and provides the generated power to the transmission lines 22, which delivers the power to the electrical loads 20, positioned throughout the aircraft 10. Furthermore, during operation, the set of supplemental power sources 24 can be selectably connected with the transmission lines 22, and operable to provide primary or supplemental power to a subset of the electrical loads 20.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one of the supplemental power sources 24 can be operated, enabled, or connected for providing power to the electrical loads 20. Additional management functions can be included.

It will be understood that while aspects of the disclosure are shown in an aircraft environment of FIG. 1, the disclosure is not so limited and can have applicability in a variety of environments. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 1 are also non-limiting examples of aspects associated with the disclosure. For example, while various components have been illustrated with relative position of the aircraft 10 (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
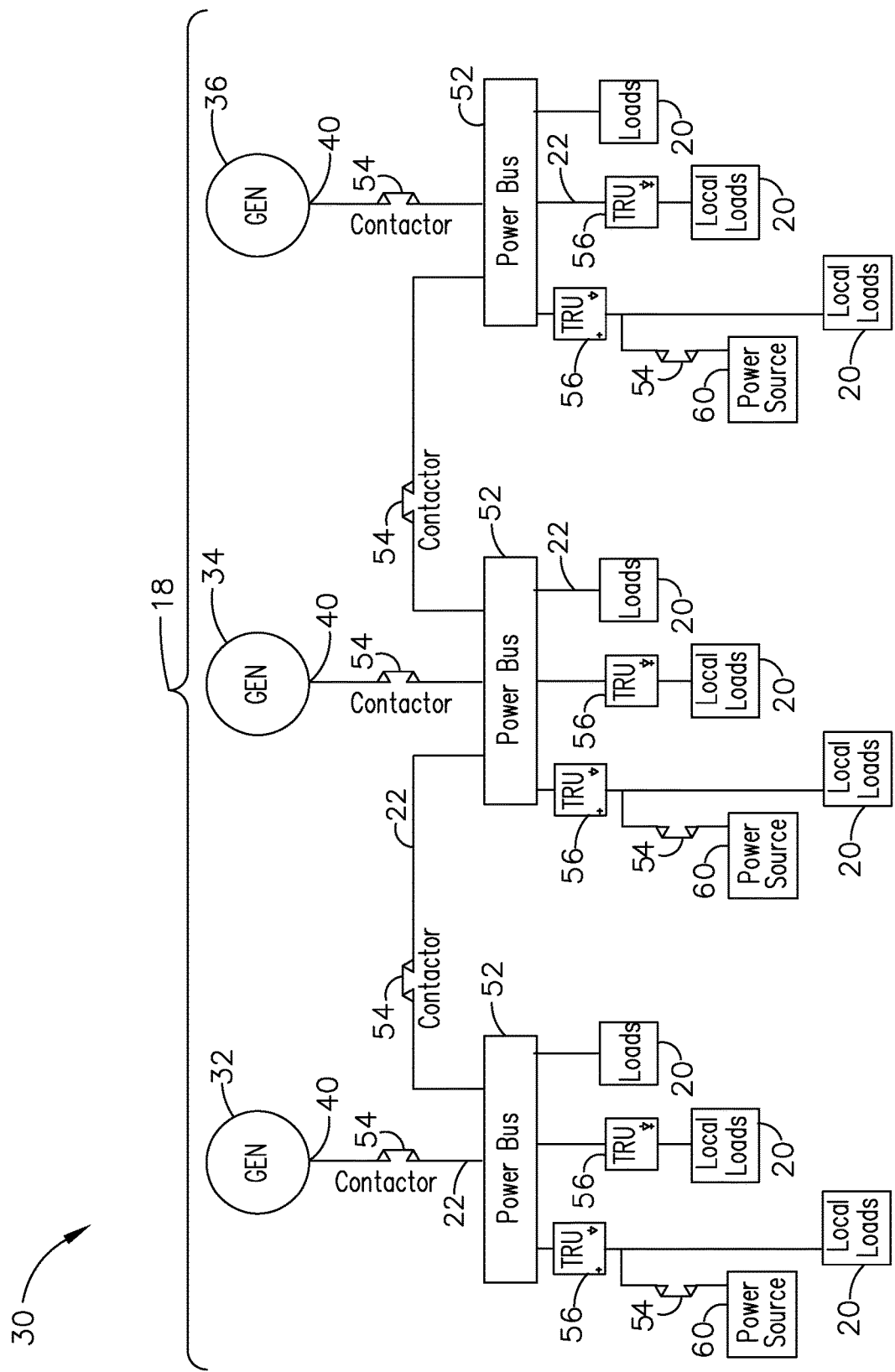
FIG. 2 is a schematic view of the power distribution system of the aircraft of FIG. 1, in accordance with various aspects described herein.

Referring now to FIG. 2, a schematic illustration is shown of an exemplary power distribution system 30 that can be utilized in the aircraft 10. The power distribution system 30 is shown having a set of power sources, such as a set of generators 18, including a first generator 32, a second generator 34, and a third generator 36. While three generators 32, 34, 36 are shown, aspects of the disclosure can include any number of generators 18 as desired. In addition, each of the set of generators 18 can include a power output 40 for supplying power to various system components. While the set of generators 18 are illustrated similarly, it is contemplated that the set of generators 18 can supply or generate substantially similar electrical power characteristics or varying electrical power characteristics or have varying power characteristics. In one non-limiting example, the first generator 32 can continuously generate 50 kiloWatts (kW) of alternating current (AC) electrical power during operation, while the second and third generators 34, 36 can continuously generate 115 kW of AC electrical power during operation. In another non-limiting example, traditional generators 18 can operate with different power characteristics depending on environmental conditions such as the solar cycle, temperature, variable-speed power generation, flight phase, maintenance cycles, or the like.

Each generator 32, 34, 36 can be connected via the power outputs 40 to a power bus 52 of the power distribution system 30, such as via the transmission lines 22. A contactor 54 can be utilized between each generator 32, 34, 36 and its respective power bus 52 as a relay or switch to selectively supply power to the respective power bus 52. The set of power buses 52 can further be connected with a corresponding set of electrical loads 20. In one non-limiting example, a subset of electrical loads 20 can be connected with a respective power bus 52 by way of at least one transformer rectifier unit (TRU) 56. As used herein, a TRU 56 can be configured or adapted to convert or rectify the electrical power characteristics of the supplied power from the power bus 52 to another, a different, an alternative, or an appropriate electrical power characteristic for a given electrical load 20. In non-limiting examples, the TRU 56 can provide voltage step-up or step-down power conversion, DC to AC power conversion, AC to DC power conversion, or AC to AC power conversion involving changes in frequency or phase. In addition, multiple power buses 52 can be bridged together by way of selectably operable contactors 54, for instance, to tie one power bus 52 with at least another power bus 52.

The power distribution system 30 can also include at least one additional power source 60 that can be selectively connected to at least one power bus 52, such as by way of a contactor 54. The power source 60 can be a direct-current (DC) power source connected to the at least one power bus 52 by way of a TRU 56. In this manner, the power source 60 can be configured or adapted to provide a supply electrical power in the same or similar electrical power characteristics as the power sources (e.g. current, voltage, etc.), such as the set of generators 18. Aspects of the disclosure can be included, however, wherein the total available, peak, or continuous power supply, wattage, or the like, of the power source 60 can be different from the other power sources.

Figure 3:
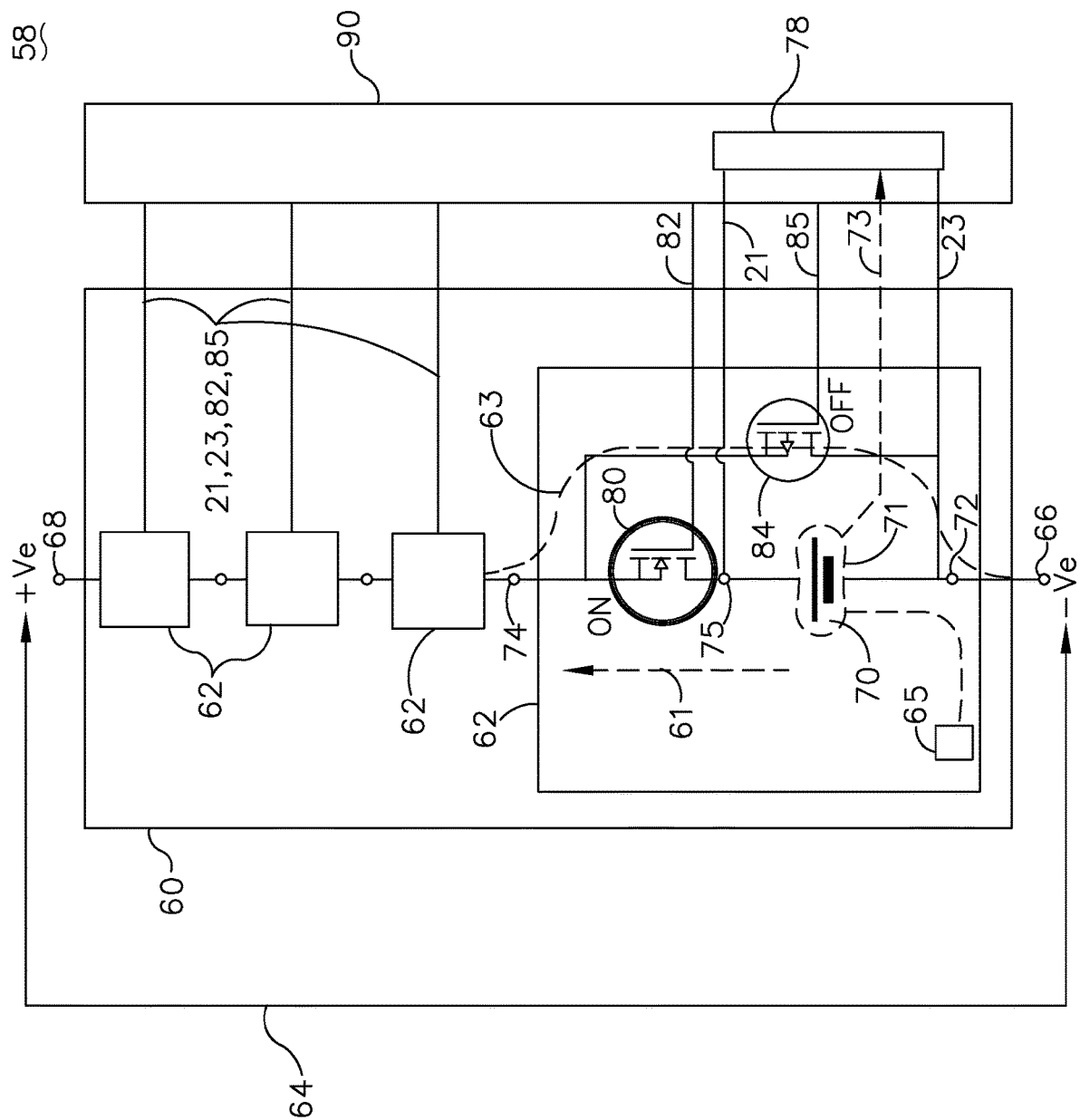
FIG. 3 is a schematic view of a power source that can be utilized in the power distribution system of FIG. 1, in accordance with various aspects described herein.

FIG. 3 schematically illustrates a system 58 for maintaining the power source 60. The power source 60 is shown having a set of rechargeable power storage devices 62 arranged or connected in series (e.g. a "stack") to generate a stack operating voltage 64 or power output of the power source 60 between a stack cathode 66 and a stack anode 68. One exemplary rechargeable power storage device 62 is shown with additional detail for understanding, wherein the power storage device 62 can include a dischargeable and rechargeable power source, such as a battery cell 70 generating a cell voltage between a local cathode 72 and a local anode 74. While a battery cell 70 is shown and described, any dischargeable and rechargeable direct current (DC) power source can be included in aspects of the disclosure.

Each power storage device 62 can also include a voltage connection in the form of an output switch 80 connected in series with the battery cell 70 and controllable by an output control signal 82. The output control signal 82 can be communicatively connected with the output switch 80, such as via a wired connection in one example. The output control signal 82 can also be configured to generate, transmit, or otherwise controllably instruct the output switch 80 to operate by way of the output control signal 82. The battery cell 70 can be connected to one of the local cathode 72 or the local anode 74, and the output switch 80 can be connected to the other of the local cathode 72 or the local anode 74. The output switch 80 is shown with a triple-circle outline indicating an ON (conductive) state, contributing its cell voltage to the stack operating voltage 64. The local cathode 72 and local anode 74 can define an electrical input or output of the power storage device 62.

Each power storage device 62 can also include a bypass connection in the form of a bypass switch 84 connected in parallel to the series arrangement of the battery cell 70 and the output switch 80, and between the local cathode and anode 72, 74. The bypass switch 84 can be configured to provide a conductive current path that bypasses the voltage output of battery cell 70. For example, a set or subset of power storage devices 62 providing a voltage or current output can traverse the bypass switch 84 of another power storage device 62, bypassing the voltage or current output of the other power storage device 62. In the illustrated example, the bypass switch 84 is indicated with a single-circle outline indicating an OFF (open circuit) state.

A bypass control signal 85 can control the bypass switch 84 to be closed and conduct a bypass stack current 63 of the power source 60 around the bypassed battery cell 70, or to be open and allow a stack current 61 to flow through the battery cell 70 if the output switch 80 is closed (ON). In a manner similar to that described above, the bypass control signal 85 can be communicatively connected with the bypass switch 84 and configured to generate, transmit, or otherwise controllably instruct the bypass switch 84 to operate. In one non-limiting example, the output switch 80 and the bypass switch 84 can be controlled or configured such that they are in opposite states relative to one another (e.g. while one is open, the other will be closed, and vice versa).

The bypass switch 84 and the output switch 80 can be any desired type of switching element, including a semiconductor device such as a FET switch, a MOSFET, a bipolar junction transistor, or any other switch known in the art. In the illustrated example, the output switch 80 can be an n-channel FET and the bypass switch 84 can be a p-channel FET.

A controller module 90 can be coupled to the output control signal 82 and the bypass control signal 85 to control the switching of the output switch 80 and the bypass switch 84, respectively. The controller module 90 can also include a sensing module 78 coupled to the battery cell 70 of the power storage device 62 and configured to sense or measure a cell parameter from the power storage device 62 or battery cell 70. Non-limiting examples of cell parameters that can be sensed by the sensing module 78 include power, voltage, current, temperature, or vibration of the battery cell 70. Based on the sensed or measured cell parameter, the controller module 90 can selectively enable the power storage device 62 to contribute to the stack operating voltage 64 by selectively closing or enabling the output switch 80, and by selectively opening or disabling the bypass switch 84, by way of generating the respective control signals 82, 85. The controller module 90 can also selectively disable the power storage device 62 by selectively disabling the output switch 80 and selectively enabling the bypass switch 84.

The power storage device 62 can further include a voltage sensor in the form of an anode monitor 21 coupled to a reference anode 75 and a cathode monitor 23 coupled to the local cathode 72. The anode and cathode monitors 21, 23 are illustrated in solid line and can be a physical component such as a wire within the power storage device 62. In addition, the anode and cathode monitors 21, 23 can also be coupled to the controller module 90 such that a cell voltage of the power storage device 62 can be sensed by or provided to the controller module 90. The cell voltage can be continuously monitored by the sensing module 78 to determine, for example, the voltage output of the battery cell 70, or if the battery cell 70 has been at least partially depleted, discharged, exhausted or the like. The sampling of the anode voltage and cathode voltage can occur directly at the anode and cathode of the battery cell 70, or can occur at a location, such as a wired location, separated from the anode or cathode.

The system 58 can also include a condition sensor 71, illustrated schematically in dotted outline. In the illustrated example, the condition sensor 71 is coupled to the battery cell 70 and configured to generate a condition signal 73 provided to the sensing module 78 of the controller module 90. The condition signal 73 is schematically illustrated in dashed line, and in one example the condition signal 73 can be provided to the sensing module 78 via either or both of the anode and cathode monitors 21, 23. The condition sensor 71 can be physically adjacent to or integrated with the battery cell 70. In one non-limiting example, the condition sensor 71 can be in the form of a power sensor configured to sense a dischargeable power characteristic of a power storage device 62 in the set of power storage devices 62. In another non-limiting example, the condition sensor 71 can be in the form of a temperature sensor and provide a cell temperature of the battery cell 70 to the sensing module 78 by way of the condition signal 73. The condition sensor 71 can also optionally monitor one or more other cell 70 parameters such as vibration, shock, pressure, a chemical constituency, an electrical signal, or any other parameter indicating a condition of the battery cell 70.

Non-limiting aspects of the disclosure can be included wherein the controller module 90 can monitor or record performance metrics that determine whether a given battery cell 70 is or can be made available to contribute to or bypass the stack operating voltage 64. For example, the controller module 90 can include tracking a voltage discharge profile over time and determine whether the battery cell 70 is "weakening" based on the anode monitor 21, the cathode monitor 23, and the condition sensor 71. As used herein, "weakening" can refer to a decreasing maximum charge capacity of the battery cell 70. While a single controller module 90 connected with each respective power storage device 62 is illustrated, non-limiting aspects of the disclosure can be included wherein a controller module 90, or a set of controller modules 90 can be associated with a respective set or subset of the power storage devices 62.

The power storage device 62 can further include a memory 65 configured to store at least one of state of charge data or capacity data for the battery cell 70. The memory 65 is schematically illustrated as in communicative connection with the battery cell 70, such as via the condition sensor 71. State of charge data can refer to a percentage of useful "battery life" or available power within a battery cell. For example, a state of charge of 100% can correlate with the battery cell 70 being charged to a maximum voltage or power threshold, and a state of charge of 0% can correlate with the battery cell 70 being entirely depleted of charge. Capacity data can refer to a maximum dischargeable power output from the battery cell 70, such as a maximum amount of stored charge in Coulombs or a maximum voltage output. It is contemplated that the memory 65 can store a current state of charge or a current capacity for each associated battery cell 70. In another example, the memory 65 can store a history of states of charge or a history of capacities for the battery cell 70, where additional data such as rates of power discharge can be stored or analyzed.

Non-limiting examples of the battery cells 70 can comprise lithium-ion composition materials nominally rated at about 3.3-3.6 volts. In such a case, such lithium-ion composition materials can provide up to 4.2 volts when fully charged. In addition, any number of battery cells 70 can be connected in series to contribute to a stack operating voltage. For example, four Li-ion cells 70 can be arranged in series to produce a combinable stack operating voltage of about 10.0 volts to 16.8 volts, neglecting losses that can occur in other components or between the local cathode 72 and the local anode 74 of the power storage device(s) 62. Additional non-limiting examples of the battery cell(s) 70 or power storage device(s) 62 can comprise alkaline, nickel-metal-hydride, or any other suitable material composition known in the art. In yet another non-limiting example, battery cells 70 of different compositions can be arranged in series, as described. Arrangement or formation of the set of battery cells 70 or power storage devices 62 can be based on a desired power output, such as the stack operating voltage 64, or a desired current output. For example, to form a higher voltage power source 60, such as a 270 volt cell stack, a larger number of battery cells 70 or power storage devices 62 can be included.

Due to the inaccuracies of conventional state of charge calculations or estimations, state of charge data can occasionally "drift" either discretely or continuously. For example, a Coulomb-counting method that integrates a sensed current from a battery cell 70 over a time period can be affected by a lack of an absolute reference point, and the resulting accumulation of inaccurate "counts" can differ from the battery cell's 70 actual state of charge. Stated another way, the battery cell 70 can include a state of charge data that inaccurately represents a present, dischargeable, or rechargeable energy storage value, such that the battery cell 70 cannot be fully utilized (e.g. discharged, recharged) due to the inaccuracy. This difference can be referred to as "drift" in the state of charge data, and recalibrating or resetting the state of charge data of the battery cell 70 can reconcile this difference.

Figure 4:
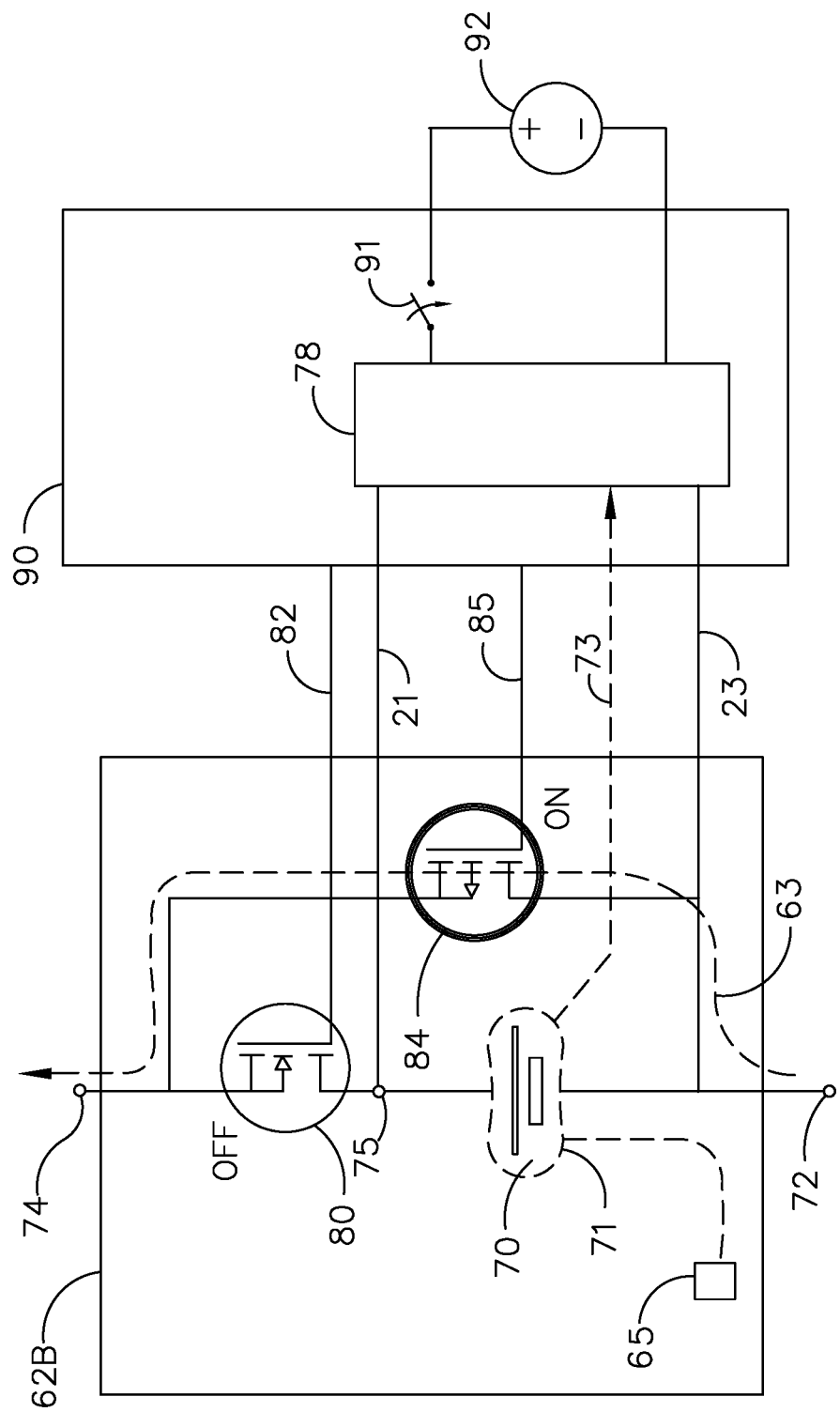
FIG. 4 is a schematic view of a power storage device in the power source of FIG. 3, in accordance with various aspects described herein.

FIG. 4 illustrates the operation of a power storage device 62 of FIG. 3 being bypassed by the controller module 90 to define a bypassed power storage device 62B. In the illustrated example, the controller module 90 has bypassed the power storage device 62B by generating control signals to selectively disable (e.g. open) the output switch 80 and selectively enable (e.g. close) the bypass switch 84. In this manner the controller module 90 can enable a bypass current pathway 63, thereby diverting stack current 61 within the bypassed storage device 62B around the battery cell 70 as shown.

A recharging power source 92 can routed to the battery cell 70 through a charger switch 91 and the sensing module 78. While the recharging power source 92 is illustrated as a separate component from the controller module 90, aspects can be included wherein the recharging power source 92 can be included in the controller module 90. In the example shown, the anode monitor 21 and cathode monitor 23 lines can be used to charge the battery cell 70 as well as to monitor the cell voltage. It is also contemplated that the recharging power source 92 can be connected to the battery cell 70 independently of the sensing module 78 or the anode or cathode monitor lines 21, 23 such as via non-sensing conductive wires not explicitly shown. While the stack current 61 is diverted along the bypass current pathway 63 around the bypassed power storage device 62B, or during periods of time when the battery cell 70 is otherwise not being discharged, the controller module 90 can apply a recharging power from the recharging power source 92 to the power storage device 62B to operably recharge the battery cell 70. Alternatively, charging lines (not shown) can be connected directly to the anode and cathode of the battery cell 70 and the recharging power source 92 and controllable by the controller module 90. It can be appreciated that bypassing of the power storage device 62B allows its battery cell 70 to be charged while maintaining the stack operating voltage 64 using other power storage devices not bypassed.

While not shown, it is also contemplated that the recharging power source 92 can be included in the controller module 90. In the example shown, the charger is electrically "floated," that is, referenced to the local cathode 72 so that each power storage device 62 in the power source 60 can utilize the recharging power source 92. In another example (not shown) wherein separate charging lines are directly connected to the anode and cathode of the battery cell 70, the charging power source 92 can optionally be referenced to "ground" or zero volts instead of the local cathode 72. The recharging power source 92 can include any locally or external power source, for example, of the aircraft 10, ground based systems, backup or supplemental power systems, generators 18, or the like.

Figure 5:
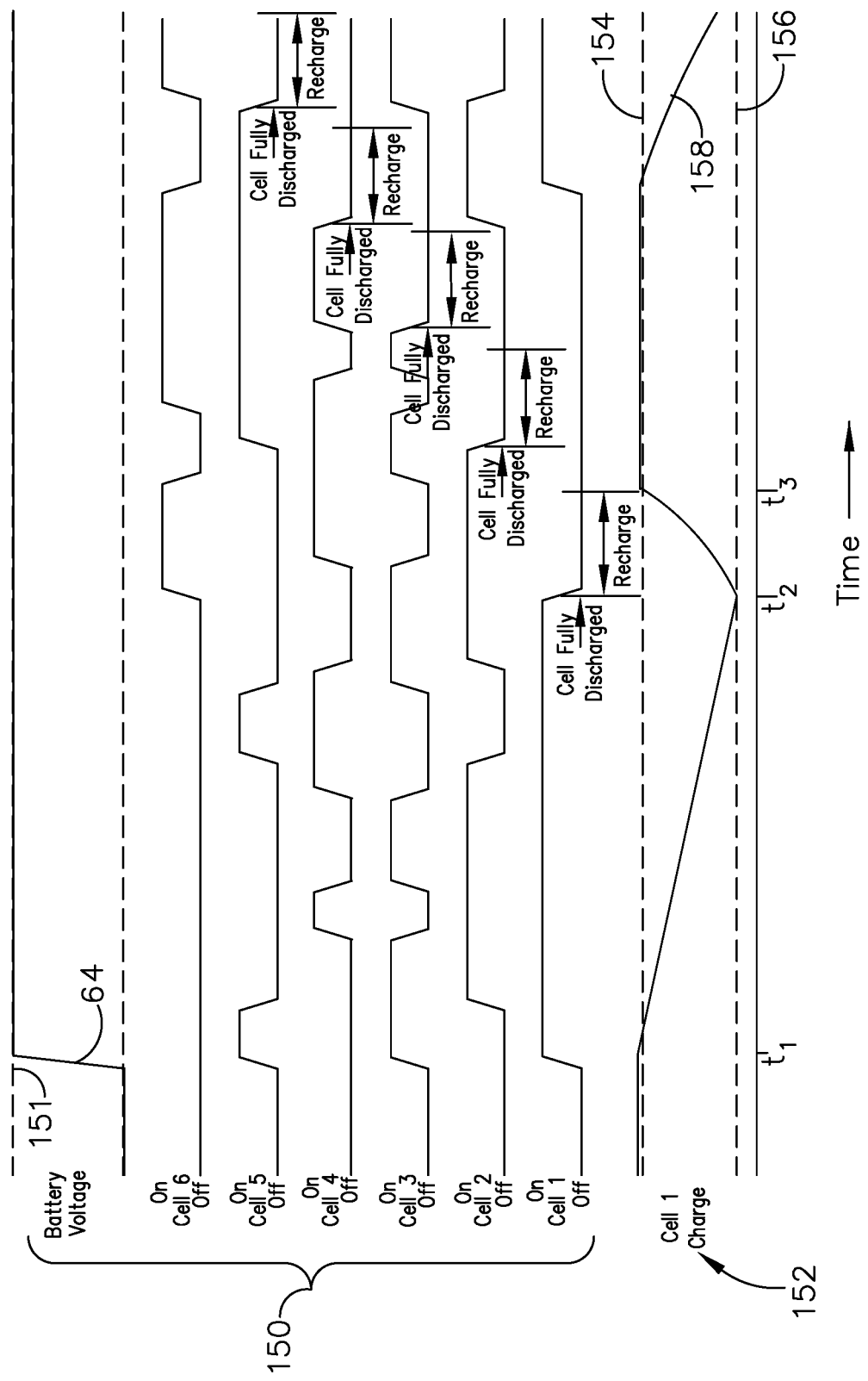
FIG. 5 illustrates charge plots for the power source and power storage device of FIG. 3, in accordance with various aspects described herein.

FIG. 5 illustrates a set 150 of charge plots illustrating an operating status of six exemplary battery cells 70 (FIG. 3) that provide a summated voltage output, illustrated as the stack operating voltage 64 (labeled as "Battery Voltage") plotted over a period of time during operation of the power source 60. The set 150 of charge plots include threshold values indicating that the corresponding battery cell 70 is "On" or "Off," wherein "On" refers to the battery cell 70 contributing to the stack operating voltage 64, and "Off" refers to the battery cell 70 being bypassed and not contributing to the stack operating voltage 64. In addition, a single representative charge plot 152 associated with "cell 1" illustrates a charge level 158 in Volts over time for one of the exemplary battery cells 70 labeled as "Cell 1 Charge." The six exemplary battery cells 70 can be identical, or they can also have differing charge capacities as desired.

At a first time (t1) the stack operating voltage 64 increases to an operating level 151 which remains constant over the illustrated time duration. The operating level 151 can be any desired voltage, such as 8 volts in a non-limiting example. At this time, the controller module 90 can selectively enable Cell 1, Cell 3, and Cell 5 to contribute to the stack operating voltage 64. The controller module 90 can also selectively disable Cell 2, Cell 4, and Cell 6 such that they do not contribute to the stack operating voltage 64.

The single charge plot 152 shows that Cell 1 has a constant or nearly-constant level of charge prior to the first time t1 when Cell 1 is "Off." It is also contemplated that Cell 1 can have a charge above a maximum voltage threshold 154, such as 4.2 volts in a non-limiting example, prior to the first time t1.

Between times $t_1$ and $t_2$, Cell 1 is "On" (i.e. contributing to the stack operating voltage 64) and the single charge plot 152 shows that Cell 1's charge is decreasing. At a second time t2, Cell 1 can have a charge level 158 at or less than a minimum voltage threshold 156 such as 2.5 volts or less in a non-limiting example. In an alternate example the minimum voltage threshold 156 can be 0 volts, wherein Cell 1 (i.e. the battery cell 70) can be depleted of stored charge.

Between the second time t2 and a third time t3, Cell 1 is "Off" (i.e. not contributing to the stack operating voltage 64) and the single charge plot 152 shows that Cell 1's charge is increasing. It should also be appreciated that at the second time t2 when Cell 1 transitions to "Off," Cell 6 transitions to "On" and the stack operating voltage 64 remains constant.

The controller module 90 can also compare the sensed voltage (e.g. the charge level 158) with the maximum voltage threshold 154. This comparison is illustrated as being satisfied at the third time t3, at which point Cell 1 is considered to be fully recharged based on the comparison.

During operation, the controller module 90 (FIG. 3) can select a rechargeable power storage device 62, such as Cell 1, from the set of power storage devices 62 (FIG. 3). In one example the controller module 90 can make the selection based on a detected need for recalibration, such as an amount of drift of capacity or state or charge in the selected power storage device 62 meeting or exceeding a predetermined threshold value. The controller module 90 can also perform the selection based upon other factors including elapsed time of operation or a detected temperature within the power storage device 62, or the selection can be performed randomly by the controller module 90, in non-limiting examples.

Once selected, the controller module 90 can allow the selected rechargeable power storage device 62 to be fully discharged. The stack operating voltage 64 (FIG. 4) of the power source 60 and the charge level 158 of the selected battery cell 70 (e.g. Cell 1) can be sensed by the controller module 90 through the anode monitor 21 and cathode monitor 23. The controller module 90 can compare the sensed voltage (e.g. the charge level 158) with the minimum voltage threshold 156. Upon satisfaction of the comparison, such as determining the sensed voltage is equal to or less than the minimum voltage threshold 156 (i.e. at the second time t2), the controller module 90 can selectively disable the selected power storage device 62, i.e. bypassing Cell 1 by enabling the bypass switch 84 and disabling the output switch 80.

The controller module 90 can also compare the charge level 158 with the maximum voltage threshold 154 and apply a recharging power from the recharging power source 92 (FIG. 4) to the selected power storage device 62. The single charge plot 152 illustrates such recharging between the second time t2 and the third time t3 wherein the charge level of Cell 1 increases while the Cell 1 plot in the set 150 of charge plots remains "Off," i.e. bypassed, during recharging. The controller module 90 can continue applying the recharging power until the selected power storage device 62 is fully recharged based on the sensed voltage or charge level 158; e.g. based on satisfaction of a comparison of the charge level 158 and the maximum voltage threshold 154. "Fully recharged" can refer to the charge level 158 meeting or exceeding the maximum voltage threshold 154 as described above.

As used herein, the maximum voltage threshold 154 can be distinct from a charge stated based on the state of charge data. Stated another way, "fully recharging" the cell as used herein can be different from when the state of charge data believes the cell is charged. For example, the state of charge stored in memory 65 (FIG. 3) of a given battery cell 70 can have sufficiently large amount of drift such that the battery cell 70 reports "100% charge" while the measured voltage is less than the maximum voltage threshold 154, thereby being less than "fully charged" and in need of maintenance or recalibration. It can also be appreciated that either or both of state of charge data and capacity data can also drift over time. For example, a cell whose capacity has reduced over time or due to mechanical or electrical stress can yield an incorrect state of charge as the last calibration data stored in memory 65 (FIG. 3) of a given battery cell 70 can would be used and indicate that the battery cell 70 has a higher SoC than it actually has.

In addition, the controller module 90 can reset at least one of the state of charge data or the capacity data in the memory 65 (FIG. 3) of the selected power storage 62 once fully recharged (e.g. once the charge level 158 satisfies the maximum voltage threshold 154). Such resetting can be a form of maintaining or calibrating the battery cell 70. In one example, the state of charge data of Cell 1 can be reset to "100%." In another example, the state of charge data for Cell 1 can be reset to a numerical value e.g. "2 Coulombs" representing a new Coulomb count of charge within Cell 1 (i.e. within the battery cell 70). It is further contemplated that the state of charge data stored in memory 65 can include an available voltage with respect to the maximum voltage threshold 154 e.g. "6.8 volts out of 9 volts max," or a numerical value representing drift in charge or voltage, in other non-limiting examples. In still another example, the capacity data stored in the memory 65 (FIG. 4) can be updated or reset, such as resetting to "4.0 amp-hours" where a prior capacity data indicated "4.5 amp-hours" in one non-limiting example. It is also contemplated that both the state of charge and capacity data can be reset in order to maintain or calibrate the battery cell 70.

While the recharging power is being applied to the selected power storage device 62 (i.e. while recharging Cell 1) the controller module 90 can integrate the electrical current received by the selected power storage device. Such integration can provide a Coulomb count of the charge stored within the selected power storage device 62. It can be appreciated that the controller module can thereby reset a Coulomb count drift of the state of charge data within the memory 65 storing the state of charge data of the selected power storage device 62. For example, the drift can be reset to zero, or reset to a minimum value such as "Less than 0.1 Coulombs" or "Less than 0.3 volts change from last full charge." Such resetting of state of charge data can recalibrate the selected power storage device 62; e.g. resetting the state of charge data after fully discharging and fully charging the selected power storage device 62. Optionally, once the controller module 90 has recharged a selected power storage device 62 and reset its state of charge data, the controller module 90 can re-enable the selected power storage device 62 to contribute to the stack operating voltage 64. In the illustrated example, Cell 1 remains bypassed (or "Off") for a duration of time after the third time t3 even as it remains fully charged.

The capacity data can optionally be determined or reset based on the state of charge data. In one example, if the charge level 158 satisfies the maximum voltage threshold 154, i.e. is "fully charged," the controller 90 can perform a comparison between the capacity data and the maximum voltage threshold 154, and the state of charge data. If the state of charge data contains an appropriate value e.g. 100% that corresponds with the Coulomb counting performed during recharging, but the capacity data is not consistent with the maximum voltage threshold 154 due to drift, the controller 90 can reset the capacity data to correspond with the maximum voltage threshold 154 and the associated Coulomb count of the recharged battery cell 70.

The controller module 90 can also monitor state of charge or capacity data for any or all of the power storage devices 62 and selectively enable at least some of the power storage devices 62 such that the stack operating voltage 64 remains at a constant value. For example, the controller module 90 can sequentially selectively disable, apply the recharging power to, and reset the state of charge data for, each power storage device 62 in the set one-by-one. As illustrated in the set 150 of charge plots, each of Cells 1-6 are disabled or "Off" and recharged as described above during at least one time interval during operation. When a first power storage device (e.g. Cell 1) is disabled or bypassed, the controller module 90 can select a second power storage device (e.g. Cell 6) and selectively enable the second selected power storage device to contribute to the stack operating voltage 64 while recharging power is applied to the first selected power storage device.

It is further contemplated that the controller module 90 can repeatedly cycle through a subsequent set of discharging and recharging cycles of a selected power storage device 62, wherein the discharging and recharging cycles are managed by the controller module 90 and based on at least the state of charge data in the memory 65 (FIG. 4). It can be appreciated that such repeated cycling can affect a drift in the state of charge or capacity data for the selected power storage device 62 undergoing a discharging and recharging cycle, including reducing or eliminating the drift. It can also be appreciated that the repeated cycling of discharging and recharging each power storage device 62 in the set can provide for continual calibration of the power source 60 and improvement in the quality or accuracy of state of charge data for the power source 60. In this manner, the selective enabling of a voltage connection in a power storage device, the comparing a sensed voltage, the selective disabling of the voltage connection and selective enabling of the bypass connection, the applying a recharging power, and the resetting of state of charge or capacity data can be performed by the controller module 90 without interrupting a continuous supply of power by the power source 60.

In other non-limiting examples, the controller module 90 can be configured to (1) selectively disable, recharge, and recalibrate multiple power storage devices 62 simultaneously, (2) always have at least one power storage device 62 in the set bypassed, recharged, and recalibrated while other power storage devices 62 in the set are enabled and contributing to the stack operating voltage 64, or (3) repeat the bypass, recharge, and recalibrate cycle at regular time intervals e.g. every 5 minutes or every 90 days, or repeat at irregular time intervals.

Figure 6:
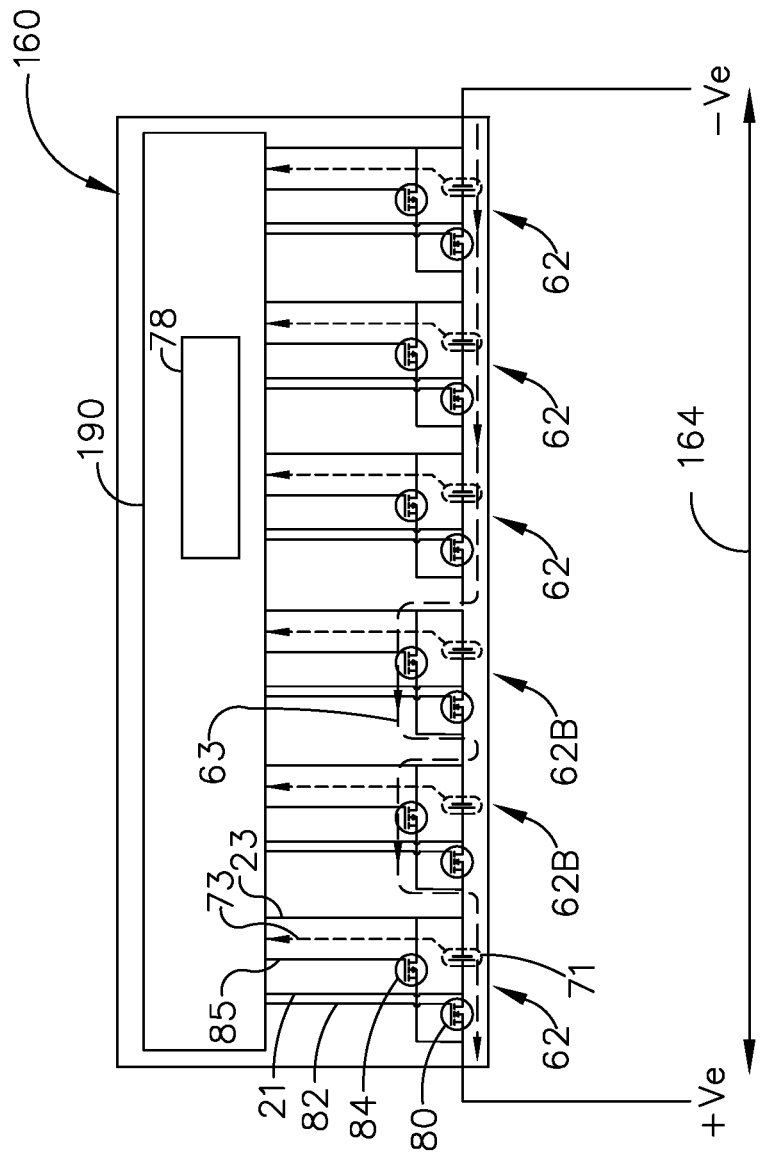
FIG. 6 is a schematic view of another power source that can be utilized in the power distribution system of FIG. 1 demonstrating a combination of selected and bypassed power storage devices, in accordance with various aspects described herein.

Referring now to FIG. 6, another power source in the form of a battery pack 160 is illustrated according to another aspect of the disclosure. The battery pack 160 is similar to the power source 60; therefore, like parts will be identified with like numerals increased by 100, with it being understood that the description of the like parts of the power source 60 applies to the battery pack 160, except where otherwise noted.

The battery pack 160 can include six power storage devices operably coupled with a single controller module 190. In the illustrated example, four power storage devices 62 are enabled by the controller module 190 to contribute to the stack operating voltage 164. Two bypassed power storage devices 62B are disabled by the controller module 190 and configured to bypass the stack operating voltage 164. Such bypassed power storage devices 62B can be bypassed via the controller module 190 selectively disabling the output switch 80 and selectively enabling the bypass switch 84 in each bypassed power storage device 62B.

The stack current 61 flowing through the battery pack 160 is illustrated. The stack current 61 can flow through enabled power storage devices 62, wherein the output switch 80 is closed or "ON" and the bypass switch 84 is open or "OFF." The stack current 61 can flow around the bypassed power storage devices 62B, wherein the output switch 80 is "OFF" and the bypass switch 84 is "ON." In the illustrated example, the four power storage devices 62 contribute to the stack operating voltage 64. The sensing module 78 can receive input from the condition sensor 71 of each power storage device 62, 62B, and the controller module 190 can enable or disable selected power storage devices 62, 62B as needed.

Figure 7:
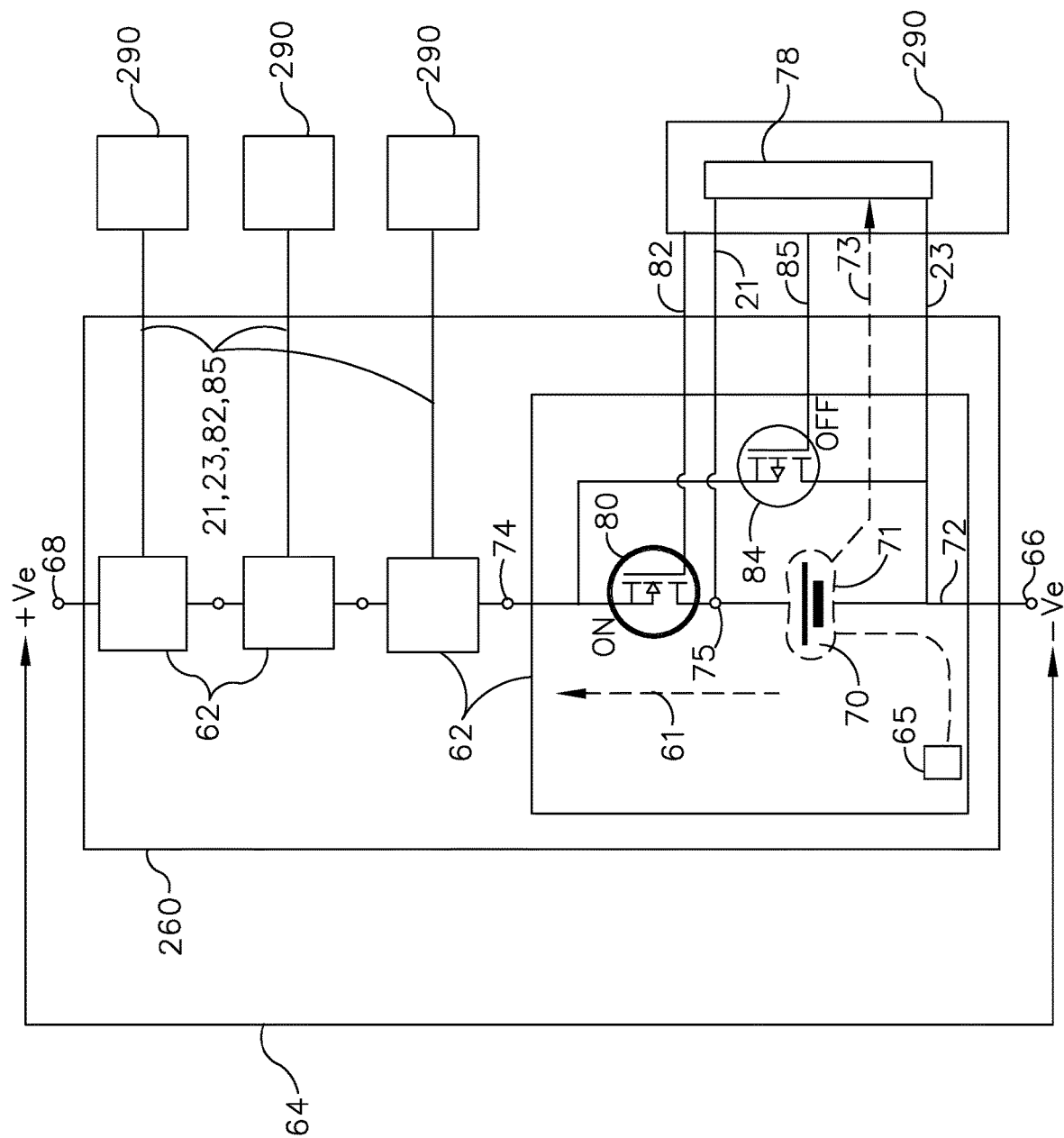
FIG. 7 is a schematic view of another power source that can be utilized in the power distribution system of FIG. 1, in accordance with various aspects described herein.

FIG. 7 illustrates another power source 260 according to another aspect of the disclosure. The power source 260 is similar to the power source 60; therefore, like parts will be identified with like numerals increased by 200, with it being understood that the description of the like parts of the power source 60 applies to the power source 260, except where otherwise noted.

It is further contemplated that a controller module 290 can be provided for each power storage device 62 in the set, wherein one controller module 290 controls a corresponding one power storage device 62 as described above. In another non-limiting example, each controller module 290 can transmit data from any or all of the condition sensor 71, anode monitor 21, or cathode monitor 23 to a master controller module (not shown) that can direct operation, enabling, or disabling of selected power storage devices 62. In still another example, each in a plurality of controller modules 290 can control a plurality of power storage devices 62 in the set.

Figure 8:
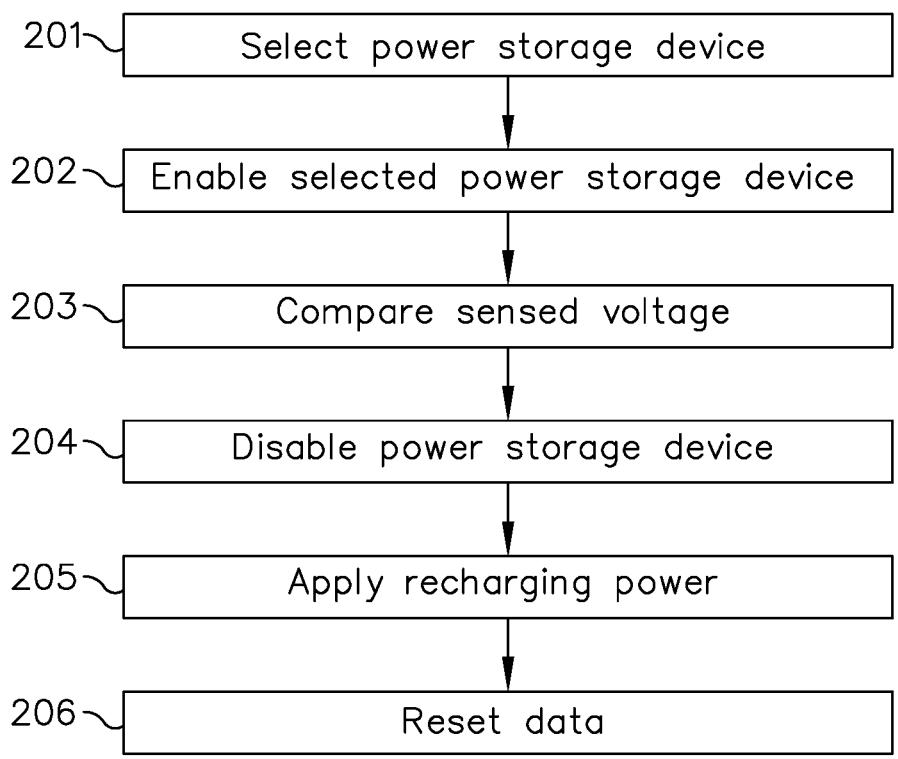
FIG. 8 is a flowchart demonstrating a method of maintaining the power source of FIG. 2, in accordance with various aspects described herein.

FIG. 8 illustrates a flowchart of a method 200 of maintaining a power source, such as the power source 60. The method includes at 201 selecting, by the controller module 90, 190, 290, a rechargeable power storage device 62 from the set of power storage devices 62 arranged to selectively provide a summated output of the power source 60 such as the stack operating voltage 64. At 202 the controller module 90 can selectively enable the selected power storage device 62 to discharge its stored power at the output of the power source 62, such as at the stack cathode 66 or stack anode 68. The selectively enabling can include at least selectively enabling a voltage connection such as the output switch 80, or selectively disabling a bypass connection such as the bypass switch 84, of the power storage device 62. At 203 the controller module 90 can compare a sensed voltage of the selected power storage device 62 with a minimum voltage threshold, such as the minimum voltage threshold 156. Upon satisfaction of the comparison, at 204 the selected power storage device 62 can be selectively disabled from discharging its stored power. The selectively disabling can include at least selectively disabling the voltage connection or selectively enabling the bypass connection of the power storage device 62, 62B. At 205 a recharging power can be applied to the selected power storage device until the selected power storage device is fully recharged based on the sensed voltage. At 206 the controller module 90, 190, 290 can reset at least one of state of charge data or capacity data of the selected power storage device, including resetting the state of charge data or the capacity data in the memory 65 of the selected power storage device 62. Optionally, the method 200 can also include repeatedly selecting a rechargeable power storage device, selectively enabling the voltage connection, comparing a sensed voltage, selectively disabling the voltage connection, selectively enabling the bypass connection, applying a recharging power, and resetting state of charge data, without interrupting a continuous supply of power by the power source.

The method 200 of maintaining a power source as described herein can be applied or performed in a variety of ways. In one non-limiting example, a controller module can select a power storage device within a power source for operation, and the selected power storage device can be enabled such that it contributes to an overall power output of the power source. The selection can be based upon a sensed need for calibration, such as to calibrate a capacity or a state of charge within the selected power storage device. The selection can also be based upon a sensed need for an overall power output from the power source, wherein the selected power storage device is enabled to contribute to the overall power output. Once enabled, the controller module can compare a sensed voltage of the selected power storage device with a minimum threshold voltage and with a maximum threshold voltage. The comparisons can be performed continually, at regular time intervals, or at irregular time intervals.

If the sensed voltage reaches the minimum voltage threshold, the controller module can disable the selected power storage device, reset its state of charge data to "0%," apply a recharging power to the storage device, and perform Coulomb counting during the recharging. New state of charge data can be calculated by the controller module. In addition, the controller module can continue to compare the sensed voltage with the maximum voltage threshold during the recharging. Once the selected power storage device is fully charged, the controller module can reset the capacity data based on the Coulomb counting performed during recharging. In this manner the selected power storage device can be recalibrated based on either or both of capacity data and state of charge data. In addition, the power source can continue to operate and provide an overall power output while the selected power storage device is recalibrated.

The controller module can also determine that a selected power storage device has a sensed voltage that satisfies the maximum voltage threshold. In such a case, the controller module can disable the selected power storage device and reset its state of charge data to "100%." This can occur after fully discharging and fully recharging the selected power storage device as described above; alternately, the controller module may select a power storage device that is already fully charged.

The controller module can further determine that a selected power storage device is needed for contribution to the overall power output of the power source. This determination can be performed after recalibration as described above, or performed after recharging the selected power storage device without calibration, or performed immediately after selecting the power storage device, in non-limiting examples. The controller module can either enable or disable the selected power storage device to contribute to the overall power output based on this determination.

Aspects of the present disclosure provide for a variety of benefits. Where typical power sources may utilize a "worst case scenario" estimate for states of charge in power sources having multiple battery cells, such estimates can lead to inaccurate states of charge or under-utilization of traditional power sources. In environments such as aircraft or emergency standby power where a steady or reliable power supply is needed, it can be impractical to take a power source offline for recalibration. In other environments such as electric vehicles, taking a power source offline can leave a user stranded without the ability to operate the electric vehicle during recalibration. The technical effect is that the above described aspects provide for the ability to recalibrate individual battery cells in a power source while still operating the power source. Such recalibration provides for increased accuracy of component monitoring without interruption of the supply of power from the power source, which can lead to increased operating efficiency or safety in a system utilizing a power source according to aspects described herein.

Traditional power source architectures or designs generally compute the capacity of a power source by multiplying the capacity of the weakest cell by the number of cells in the power source. It can be appreciated that aspects of the disclosure provide for an increased capacity in a power source, as each battery cell in the power source can be maintained or recalibrated to provide for more accurate capacities, instead of estimating based on a worst-performing battery cell.

Many other possible embodiments and configurations in addition to that shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A method for maintaining a power source, including selecting, by a controller module, a rechargeable power storage device from a set of power storage devices arranged to selectively provide a summated output of the power source, selectively enabling, by the controller module, the selected power storage device to discharge its stored power at the output of the power source, comparing, by the controller module, a sensed voltage of the selected power storage device with a minimum voltage threshold, and upon satisfaction of the comparison, selectively disabling the selected power storage device from discharging its stored power, applying a recharging power to the selected power storage device until the selected power storage device is fully recharged based on the sensed voltage, and resetting at least one of state of charge data or capacity data of the selected power storage device.

2. The method of any preceding clause wherein the selectively enabling the selected power storage device further comprises at least one of selectively enabling a voltage connection or selectively disabling a bypass connection of the selected power storage device.

3. The method of any preceding clause wherein the minimum voltage threshold is 2.5 Volts or less.

4. The method of any preceding clause wherein the selectively disabling the selected power storage device further comprises at least one of selectively disabling a voltage connection or selectively enabling a bypass connection of the selected power storage device.

5. The method of any preceding clause further comprising comparing, by the controller module, the sensed voltage with a maximum voltage threshold, and upon satisfaction of the comparison, resetting the state of charge data.

6. The method of any preceding clause further comprising monitoring the state of charge data of the selected power storage device.

7. The method of any preceding clause, further comprising selecting a second power storage device from the set of power storage devices and selectively enabling, by the controller module, the second selected power storage device during the applying a recharging power to the selected power storage device.

8. The method of any preceding clause further comprising sequentially selectively disabling each power storage device in the set of power storage devices one-by-one from discharging its stored power, and sequentially applying the recharging power to the selectively disabled power storage device.

9. The method of any preceding clause further comprising repeatedly cycling, by the controller module, through a subsequent set of discharging and recharging cycles of the selected power storage device, wherein the discharging and recharging cycles are managed by the controller module and based on at least the state of charge data.

10. The method of any preceding clause wherein the repeatedly cycling affects a drift in the at least one of state of charge data or capacity data.

11. The method of any preceding clause wherein the resetting at least one of state of charge data or capacity data further comprises resetting a Coulomb count drift of a state of charge data within the selected power storage device.

12. The method of any preceding clause further comprising integrating, by the controller module, an electrical current received by the selected power storage device during the applying the recharging power to the selected power storage device.

13. A system for maintaining a power source, including a set of power storage devices arranged to selectively provide a summated output of the power source, each of the set of power storage devices having a voltage sensor and memory storing at least one of state of charge data or capacity data, a recharging power source, and a controller module configured to select a rechargeable power storage device from the set of power storage devices, to selectively enable the selected power storage device to discharge its stored power to the output of the power source, to compare a voltage sensed by the voltage sensor of the selected power storage device with a minimum voltage threshold, and upon satisfaction of the comparison, to selectively disable the selected power storage device from discharging its stored power, to apply a recharging power from the recharging power source to the selected power storage device until the selected power storage device is fully recharged based on the sensed voltage, and to reset at least one of the state of charge data or the capacity data of the selected power storage device.

14. The system of any preceding clause wherein each power storage device in the set of power storage devices further includes an output switch and a bypass switch.

15. The system of any preceding clause wherein the controller module is configured to selectively enable the selected power storage device by selectively enabling the output switch and selectively disabling the bypass switch.

16. The system of any preceding clause further comprising a set of controller modules, wherein each controller module in the set of controller modules is communicatively coupled to a corresponding power storage device in the set of power storage devices.

17. The system of any preceding clause further including a power sensor configured to sense a dischargeable power characteristic of a power storage device in the set of power storage devices.

18. A method for maintaining a power source, including, selecting, by a controller module, a rechargeable power storage device from a set of power storage devices arranged in series and each having a voltage connection and a bypass connection, selectively enabling, by the controller module, the voltage connection of the selected power storage device such that the power storage device discharges its stored power at an output of the power source, comparing, by the controller module, a sensed voltage of the selected power storage device with a minimum voltage threshold, and upon satisfaction of the comparison, selectively disabling the voltage connection of the selected power storage device, selectively enabling the bypass connection of the selected power storage device, applying a recharging power to the selected power storage device until the selected power storage device is fully recharged based on a sensed voltage, and resetting at least one of state of charge data or capacity data of the selected power storage device to calibrate the selected power storage device.

19. The method of any preceding clause further comprising sensing, by each in a set of controller modules, an output voltage of each in the corresponding set of power storage devices.

20. The method of any preceding clause further comprising repeatedly selecting a rechargeable power storage device, selectively enabling the voltage connection, comparing a sensed voltage, selectively disabling the voltage connection, selectively enabling the bypass connection, applying a recharging power, and resetting at least one of state of charge data or capacity data, without interrupting a continuous supply of power by the power source.

What is claimed is:

1. A method for maintaining a power source, comprising:
    selecting, by a controller module, a rechargeable power storage device from a set of power storage devices arranged to selectively provide a summated output of the power source, the selected rechargeable power storage device including a memory configured to store at least one of a state of charge data or a capacity data, the state of charge data corresponding to a present rechargeable energy storage value of the selected rechargeable power storage device, and the capacity data corresponding to a present dischargeable energy storage value of the selected rechargeable power storage device, selectively enabling, by the controller module, the selected rechargeable power storage device to discharge its stored power at the output of the power source;

comparing, by the controller module, a sensed voltage of the selected rechargeable power storage device with a minimum voltage threshold; and upon satisfaction of the comparison when the sensed voltage reaches the minimum voltage threshold:
- selectively disabling the selected rechargeable power storage device from discharging its stored power;
- applying a recharging power to the selected rechargeable power storage device until the selected power rechargeable storage device is fully recharged based on the sensed voltage;
- calculating a new state of charge data based on the sensed voltage; and
- resetting at least one of the state of charge data or the capacity data of the selected power rechargeable storage device with the new state of charge data;
- wherein the resetting of at least one of the state charge data or the capacity data is used to reduce a drift between the state of charge data or the capacity data and the present rechargeable energy storage value or the present dischargeable energy storage value, respectively, of the selected power rechargeable storage device.

2. The method of claim 1 wherein the selectively enabling the selected power rechargeable storage device further comprises at least one of selectively enabling a voltage connection or selectively disabling a bypass connection of the selected rechargeable power storage device.

3. The method of claim 2 wherein the minimum voltage threshold is 2.5 Volts or less.

4. The method of claim 1 wherein the selectively disabling the selected rechargeable power storage device further comprises at least one of selectively disabling a voltage connection or selectively enabling a bypass connection of the selected rechargeable power storage device.

5. The method of claim 4 further comprising comparing, by the controller module, the sensed voltage with a maximum voltage threshold, and upon satisfaction of the comparison, resetting the state of charge data.

6. The method of claim 5 further comprising monitoring the state of charge data of the selected rechargeable power storage device.

7. The method of claim 1, further comprising selecting a second power storage device from the set of power storage devices and selectively enabling, by the controller module, the second selected power storage device during the applying a recharging power to the selected power storage device.

8. The method of claim 1 further comprising sequentially selectively disabling each power storage device in the set of power storage devices one-by-one from discharging its stored power, and sequentially applying the recharging power to the selectively disabled power storage device.

9. The method of claim 8 further comprising repeatedly cycling, by the controller module, through a subsequent set of discharging and recharging cycles of the selected rechargeable power storage device, wherein the discharging and recharging cycles are managed by the controller module and based on at least the state of charge data.

10. The method of claim 9 wherein the repeatedly cycling affects the drift in the at least one of state of charge data or capacity data.

11. The method of claim 1 wherein the resetting at least one of state of charge data or capacity data further comprises resetting a Coulomb count drift of a state of charge data within the selected rechargeable power storage device.

12. The method of claim 1 further comprising integrating, by the controller module, an electrical current received by the selected rechargeable power storage device during the applying the recharging power to the selected rechargeable power storage device.

13. A system for maintaining a power source, comprising:
- a set of power storage devices arranged to selectively provide a summated output of the power source, each of the set of power storage devices having a voltage sensor and memory storing at least one of state of charge data or capacity data, the state of charge data corresponding to a present rechargeable energy storage value of the each of the set of power storage devices, and the capacity data corresponding to a present dischargeable energy storage value of each of the set of power storage devices;
- a recharging power source; and
- a controller module configured to select a rechargeable power storage device from the set of power storage devices, to selectively enable the selected rechargeable power storage device to discharge its stored power to the output of the power source, to compare a voltage sensed by the voltage sensor of the selected rechargeable power storage device with a minimum voltage threshold, and upon satisfaction of the comparison when the sensed voltage reaches the minimum voltage threshold, to selectively disable the selected rechargeable power storage device from discharging its stored power, to apply a recharging power from the recharging power source to the selected rechargeable power storage device until the selected rechargeable power storage device is fully recharged based on the sensed voltage, to calculate new state of charge data based on the sensed voltage, and to reset at least one of the state of charge data or the capacity data of the selected rechargeable power storage device with the new state of charge data;
- wherein the reset of at least one of the state of charge data or the capacity data is used to reduce a drift between the state of charge data or the capacity data and the present rechargeable energy storage value or the present dischargeable energy storage value, respectively, of the rechargeable power storage device.

14. The system of claim 13 wherein each power storage device in the set of power storage devices further includes an output switch and a bypass switch.

15. The system of claim 14 wherein the controller module is configured to selectively enable the selected rechargeable power storage device by selectively enabling the output switch and selectively disabling the bypass switch.

16. The system of claim 13 further comprising a set of controller modules, wherein each controller module in the set of controller modules is communicatively coupled to a corresponding power storage device in the set of power storage devices.

17. The system of claim 13 further including a power sensor configured to sense a dischargeable power characteristic of a power storage device in the set of power storage devices.

18. A method for maintaining a power source, comprising:
- selecting, by a controller module, a rechargeable power storage device from a set of power storage devices arranged in series and each having a voltage connection and a bypass connection, the selected rechargeable power storage device including a memory configured to store at least one of a state of charge data or a capacity data, the state of charge data corresponding to a resent rechargeable energy storage value of the selected rechargeable power storage device, and the capacity data corresponding to a present dischargeable energy storage value of the selected rechargeable power storage device;

selectively enabling, by the controller module, the voltage connection of the selected rechargeable power storage device such that the power storage device discharges its stored power at an output of the power source;

comparing, by the controller module, a sensed voltage of the selected, rechargeable power storage device with a minimum voltage threshold; and upon satisfaction of the comparison when the sensed voltage reaches the minimum voltage threshold:

selectively disabling the voltage connection of the selected rechargeable power storage device;

selectively enabling the bypass connection of the selected rechargeable power storage device;

applying a recharging power to the selected rechargeable power storage device until the selected rechargeable power storage device is fully recharged based on a sensed voltage;

calculating a new state of charge data based on the sensed voltage; and resetting at least one of the state of charge data or the capacity data of the selected rechargeable power storage device with the new state of charge data to calibrate the selected rechargeable power storage device.

19. The method of claim 18 further comprising sensing, by each in a set of controller modules, an output voltage of each in the corresponding set of power storage devices.

20. The method of claim 18 further comprising repeatedly selecting a rechargeable power storage device, selectively enabling the voltage connection, comparing a sensed voltage, selectively disabling the voltage connection, selectively enabling the bypass connection, applying a recharging power, and resetting at least one of state of charge data or capacity data, without interrupting a continuous supply of power by the power source.

* * * * *